United States Patent
Kim et al.

(10) Patent No.: US 11,180,883 B2
(45) Date of Patent: Nov. 23, 2021

(54) WASHING MACHINE AND METHOD FOR CONTROLLING WASHING MACHINE

(71) Applicant: Samsung Electronics Co., Ltd, Suwon-si (KR)

(72) Inventors: Hyun-oh Kim, Hwaseong-si (KR); Sung-mo Lee, Gunpo-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 119 days.

(21) Appl. No.: 16/472,822

(22) PCT Filed: Oct. 30, 2017

(86) PCT No.: PCT/KR2017/012091
§ 371 (c)(1),
(2) Date: Jun. 21, 2019

(87) PCT Pub. No.: WO2018/117396
PCT Pub. Date: Jun. 28, 2018

(65) Prior Publication Data
US 2020/0087829 A1    Mar. 19, 2020

(30) Foreign Application Priority Data
Dec. 23, 2016  (KR) .................... 10-2016-000178391

(51) Int. Cl.
*D06F 33/00*    (2020.01)
*D06F 34/18*    (2020.01)
(Continued)

(52) U.S. Cl.
CPC ............ *D06F 33/00* (2013.01); *D06F 34/18* (2020.02); *D06F 35/007* (2013.01); *D06F 37/20* (2013.01);
(Continued)

(58) Field of Classification Search
None
See application file for complete search history.

(56) References Cited

U.S. PATENT DOCUMENTS

| 7,412,740 | B2 | 8/2008 | Park et al. |
| 8,679,198 | B2 | 3/2014 | Bae et al. |
| 9,127,388 | B2 | 9/2015 | Oh et al. |

FOREIGN PATENT DOCUMENTS

| AU | 689727 B2 | 4/1998 |
| EP | 2128324 A1 | 12/2009 |

(Continued)

OTHER PUBLICATIONS

Park, "KR20050012452A English machine translation.pdf", Feb. 2, 2005—Machine translation from Espacenet.com.*

(Continued)

*Primary Examiner* — Levon J Shahinian (57) ABSTRACT

A washing machine is disclosed. The present washing machine comprises: a motor for driving a spin-dry tub such that a maximum rotational speed of the spin-dry tub has a preset value during spin-drying; and a processor for acquiring dry clothes weight and wet clothes weight of laundry put into the spin-dry tub, determining whether the washing machine is overloaded in the spin-drying on the basis of the acquired dry clothes weight and wet clothes weight, and controlling driving of the motor such that the maximum rotational speed of the motor is a value less than the preset value during the spin-drying, if the washing machine is determined to be overloaded.

13 Claims, 7 Drawing Sheets

(51) Int. Cl.
*D06F 35/00* (2006.01)
*D06F 37/20* (2006.01)
*D06F 37/30* (2020.01)
*D06F 39/00* (2020.01)

(52) U.S. Cl.
CPC ............ *D06F 37/203* (2013.01); *D06F 37/30* (2013.01); *D06F 37/304* (2013.01); *D06F 39/00* (2013.01); *D06F 2202/10* (2013.01); *D06F 2204/065* (2013.01); *Y02B 40/00* (2013.01)

(56) References Cited

FOREIGN PATENT DOCUMENTS

| | | |
|---|---|---|
| EP | 2692936 A1 | 2/2014 |
| EP | 3051016 A1 | 8/2016 |
| JP | 07-323195 A | 12/1995 |
| JP | 2005-46170 A | 2/2005 |
| KR | 10-1997-0006588 B1 | 4/1997 |
| KR | 10-0161919 B1 | 12/1998 |
| KR | 10-2005-0012452 A | 2/2005 |
| KR | 10-2007-0075487 A | 7/2007 |
| KR | 10-0977568 B1 | 8/2010 |
| KR | 10-1028087 B1 | 4/2011 |
| KR | 10-1138888 B1 | 5/2012 |

OTHER PUBLICATIONS

Matsumoto et al., "JPH07323195A English machine translation. pdf", Dec. 12, 1995—Machine translation from Espacenet.com.*
Supplementary European Search Report dated Sep. 10, 2019 in connection with European Patent Application No. 17 88 3838, 7 pages.
International Search Report dated Feb. 9, 2018 in connection with International Patent Application No. PCT/KR2017/012091, 2 pages.
Written Opinion of the International Searching Authority dated Feb. 9, 2018 in connection with International Patent Application No. PCT/KR2017/012091, 6 pages.
Office Action dated Jul. 27, 2021 in connection with India Patent Application No. 201917027632, 7 pages.

* cited by examiner

WASHING MACHINE AND METHOD FOR CONTROLLING WASHING MACHINE

CROSS-REFERENCE TO RELATED APPLICATIONS

This application is a 371 of International Application No. PCT/KR2017/012091 filed Oct. 30, 2017, which claims priority to Korean Patent Application No. 10-2016-0178391 filed Dec. 23, 2016, the disclosures of which are herein incorporated by reference in their entirety.

BACKGROUND

1. Field

Apparatuses and methods consistent with the disclosure relate to a washing machine and a method for controlling the washing machine and more particularly, to a washing machine capable of sensing overload and vibration during spin-drying and a method for controlling the washing machine.

2. Description of Related Art

A washing machine is an apparatus for washing laundry such as clothes, towels, sheets and the like through washing, rinsing and spin-drying. In the washing machine, a spin-dry tub (or inner tub) is rotated by driving force of a driving motor and performs all washing processes such as the washing, rinsing, and spin-drying. Here, the spin-drying refers to a process in which washing water is discharged in a state where the spin-dry tub is stopped after the rinsing process, and then the washing water contained in the laundry is separated and removed from the laundry by a centrifugal force when the spin-dry tub is rotated at a high speed.

In a conventional washing machine, a rotational speed of the spin-dry tub is raised up to a preset maximum rotational speed for all loads regardless of a weight of laundry in the spin-drying. However, in this case, the heavier the weight of laundry containing the washing water is, the more overloaded and more vibrated the washing machine is; the washing machine thus has higher failure rate.

In addition, in the conventional washing machine, in order to reduce excessive vibration or noise caused by eccentricity of the laundry, overload of the washing machine, or inconsistency in a horizontal position of the washing machine, a separate micro electronic mechanical system (MEMS) sensor is attached to a tub or a printed board assembly (PBA) to sense vibration of the washing machine. However, in the conventional washing machine, a vibration sensing function depends only on the MEMS sensor, and thus when the MEMS sensor is damaged or malfunctions, the vibration of the washing machine may not be sensed. Accordingly, the excessive vibration and noise may occur in the spin-drying or the like requiring a high-speed rotation of the spin-dry tub.

SUMMARY

The disclosure provides a washing machine capable of sensing overload of the washing machine before starting spin-drying and capable of sensing vibration of the washing machine without a separate micro electronic mechanical system (MEMS) sensor and a method for controlling the washing machine.

According to the disclosure, a washing machine may include: a motor for driving a spin-dry tub such that a maximum rotational speed of the spin-dry tub has a preset value during spin-drying; and a processor for acquiring dry clothes weight and wet clothes weight of laundry put into the spin-dry tub, determining whether the washing machine is overloaded in the spin-drying on the basis of the acquired dry clothes weight and wet clothes weight, and controlling driving of a motor such that the maximum rotational speed of the motor is a value less than the preset value during the spin-drying, if the washing machine is determined to be overloaded.

The processor may determine that the washing machine is overloaded when the wet clothes weight of the laundry has a value more than a preset threshold value.

The processor may determine that the washing machine is overloaded when the wet clothes weight of the laundry has a value more than a threshold value calculated on the basis of the dry clothes weight of the laundry.

The processor may calculate the threshold value on the basis of pre-measured data on the wet clothes weight compared to the dry clothes weight of the laundry.

The processor may calculate the threshold value using the following equation:

$$\text{MaxRPMLimit} = WCS * \text{WashWeightData} + WCI$$

Here, MaxRPMLimit is the threshold value; WCS is a slope value of the wet clothes weight compared to the dry clothes weight in the pre-measured data; WashWeightData is the acquired dry clothes weight; and WCI is the wet clothes weight compared to a minimum dry clothes weight in the pre-measured data.

The spin-drying may include preliminary spin-drying and main spin-drying; and the processor may acquire the wet clothes weight of the laundry after the preliminary spin-drying.

The processor may calculate a rotational inertia value by rotating the spin-dry tub in a state where the laundry is put into the spin-dry tub, and may acquire the dry clothes weight and the wet clothes weight on the basis of the calculated rotational inertia value.

When determining that the washing machine is overloaded, the processor may limit the maximum rotational speed of the spin-dry tub from 40% to 70% of the preset value.

The processor may further include a sensor for sensing at least one of a torque and an acceleration of the motor, in which the processor calculates at least one of a torque variation amount and an acceleration variation amount of the motor on the basis of at least one of the torque and the acceleration of the motor sensed through the sensor during performing the spin-drying, and stop the spin-drying when the calculated torque variation amount has a value more than a preset threshold value or the calculated acceleration variation amount has a value more than a preset threshold value.

In addition, in a low-speed rotation section in which the motor has a rotational speed having the preset value or less, the processor may determine whether the torque fluctuation amount has a value more than the preset threshold value; and in a high-speed rotation section in which the motor has a rotational speed having a value more than the preset value, the processor may determine whether the acceleration variation amount has a value more than the preset threshold value.

Meanwhile, according to an embodiment in the disclosure, a method for controlling a washing machine with a motor for driving a spin-dry tub such that a maximum rotational speed of a spin-dry tub has a preset value during spin-drying, the method may include: acquiring dry clothes weight and wet clothes weight of laundry put into the spin-dry tub; determining whether the washing machine is overloaded in the spin-drying on the basis of the acquired dry clothes weight and wet clothes weight; and controlling driving of the motor such that the maximum rotational speed of the motor has a value less than the preset value during the spin-drying, when the washing machine is determined to be overloaded.

In the determining, the washing machine may be determined to be overloaded when the wet clothes weight of the laundry has a value more than a preset threshold value.

In the determining, the washing machine may be determined to be overloaded when the wet clothes weight of the laundry has a value more than a threshold value calculated on the basis of the dry clothes weight of the laundry.

In the determining, the threshold value may be calculated on the basis of pre-measured data on the wet clothes weight compared to the dry clothes weight of the laundry.

In the determining, the threshold value may be calculated using the following equation:

$$MaxRPMLimit=WCS*WashWeightData+WCI$$

Here, MaxRPMLimit is the threshold value; WCS is a slope value of the wet clothes weight compared to the dry clothes weight in the pre-measured data; WashWeightData is the acquired dry clothes weight; and WCI is the wet clothes weight compared to a minimum dry clothes weight in the pre-measured data.

The spin-drying may include preliminary spin-drying and main spin-drying; and in the acquiring, the wet clothes weight of the laundry may be acquired after the preliminary spin-drying.

In the acquiring, a rotational inertia value may be calculated by rotating the spin-dry tub in a state where the laundry is put into the spin-dry tub, and the dry clothes weight and the wet clothes weight may be acquired on the basis of the calculated rotational inertia value.

In the controlling of the driving, when the washing machine is determined to be overloaded, the maximum rotational speed of the spin-dry tub may be limited from 40% to 70% of the preset value.

The washing machine may further include a sensor configured to sense at least one of a torque and an acceleration of the motor. The method for controlling the washing machine may further include: calculating at least one of a torque variation amount and an acceleration variation amount of the motor on the basis of at least one of the torque and the acceleration of the motor sensed through the sensor during performing the spin-drying; and stopping the spin-drying when the calculated torque variation amount has a value more than a preset threshold value or the calculated acceleration variation amount has a value more than a preset threshold value.

In the stopping, in a low-speed rotation section in which the motor has a rotational speed having a value less than the preset value, whether the torque variation amount has a value more than the preset threshold value may be determined; and in a high-speed rotation section in which the motor has a rotational speed having a value more than the preset value, whether the acceleration variation amount has a value more than the preset threshold value may be determined. When the torque variation amount or the acceleration variation amount has a value more than each preset threshold value, the washing machine may each stop the spin-drying.

As seen above, according to the various embodiments in the disclosure, the washing machine may sense the overload of the washing machine before starting spin-drying and the vibration of the washing machine without the micro electronic mechanical system (MEMS) sensor. Operations of the washing machine are controlled depending on the overload or vibration of the washing machine sensed as described above; and thus, the washing machine may have improved stability and lower failure rate.

DETAILED DESCRIPTION

Hereinafter, terms used in various embodiments in the disclosure are briefly described.

When it is decided that a detailed description for the known art related to the disclosure may unnecessary obscure the gist of the disclosure, it is omitted. In addition, terms "~er (or ~or)" for components used in the following description are used only to easily make the disclosure. Therefore, these terms do not have meanings or roles distinguished from each other in themselves.

Terms used in the specification are used to describe embodiments, and are not intended to restrict and/or limit the disclosure. Singular forms are intended to include plural forms unless the context clearly indicates otherwise.

It is to be further understood that terms "include" or "have" used in the specification specify the presence of features, numerals, steps, operations, components, parts mentioned in the specification, or combinations thereof, but do not preclude the presence or addition of one or more other features, numerals, steps, operations, components, parts, or combinations thereof.

On the other hand, in the embodiments, it is to be understood that when one portion is referred to as being connected to another portion, the one portion may be not only directly connected to another portion or but also indirectly connected to another portion through a third medium. In addition, unless explicitly described otherwise, "comprising" any components is to be understood to imply further inclusion of other components but not exclusion of any other components.

A washing machine generally includes a tub, wherein the tub includes an inner tub and an outer tub. The outer tub is also called a washing tub in other words, which is not rotated depending on rotation of a motor. The inner tub, that is, a spin-dry tub is rotated by receiving a driving force of the motor; and the spin-dry tub is rotated, thereby all washing processes are performed.

Meanwhile, laundry is put into the spin-dry tub. In general, dry clothes refers to laundry put into the spin-dry tub for the first time for washing and yet to be wetted by washing water, and wet clothes refers to laundry wetted with washing water as washing is started, that is, laundry containing the washing water.

In addition, in the following various embodiments, a unit of a rotational speed of the motor or the spin-dry tub may use revolutions per minute (RPM), but is not limited thereto; and may also use another units, for example, min-1 or angular velocity w (rad/s), etc.

Figure 1:
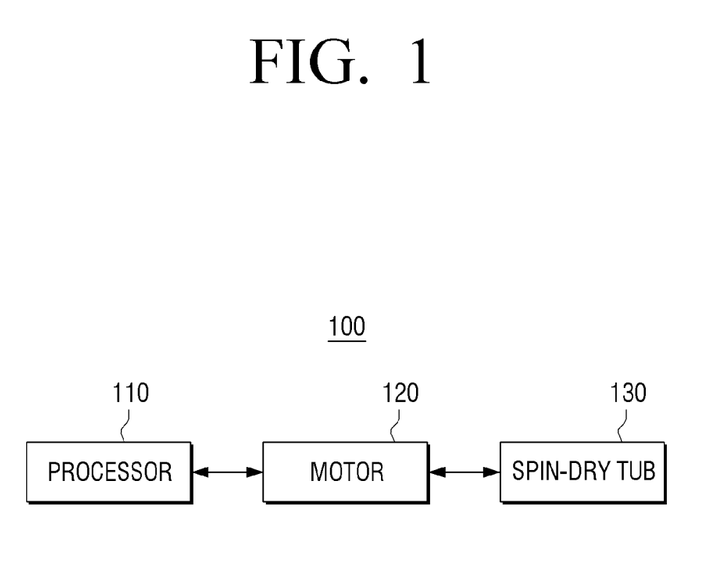
FIG. 1 is a block diagram illustrating a washing machine according to an embodiment in the disclosure.

Hereinafter, the various embodiments in the disclosure are described in detail with reference to the accompanying drawings. FIG. 1 is a block diagram illustrating a washing machine according to an embodiment in the disclosure. Referring to FIG. 1, a washing machine 100 includes a processor 110, a motor 120, and a spin-dry tub 130. Here, the washing machine 100 may be a pulsator type washing machine, a drum washing machine, a swirl type washing machine, a stirring type washing machine, or the like; and has no limitation on implemented types regardless of a classification standard, name or the like thereof.

The motor 120 is rotated depending on a drive control signal of the processor 110 and transmits a rotational driving force to the spin-dry tub 130, thereby rotating the spin-dry tub 130. In particular, the motor 120 may drive the spin-dry tub 130 so that a maximum rotational speed of the spin-dry tub 130 has a preset value during the spin-drying.

In detail, the spin-dry tub 130 may perform the spin-drying by: starting an initial rotation depending on driving of the motor 120 for the spin-drying; then raising a rotational speed stepwise to a maximum rotational speed of the preset value; and then reducing the rotational speed stepwise again.

Here, the preset value may vary depending on a washing course set by a user or depending on a type of the spin-drying to be performed. For example, in case that there are three types of the spin-drying such as strong, medium, and weak, the preset value of the maximum rotational speed may be relatively lowered in order of strong, medium, and weak strength.

The processor 110 controls all the operations of the washing machine 100. In detail, the processor 110 controls the operations of the washing machine 100 according to a user's operation, and performs washing, rinsing, spin-drying, and the like to wash the laundry.

In particular, the processor 110 may control the driving of the motor 120. In detail, the processor 110 may output a motor drive control signal for controlling a variable speed of the motor 120 to the motor 120 to control the rotational speed of the motor 120.

The rotational driving force of the motor 120 is transmitted to the spin-dry tub 130, and thus the processor 110 may control the driving of the motor 120, thereby also controlling the rotational speed of the spin-dry tub 130. Here, a rotation number of the motor 120 and that of the spin-dry tub 130 may be equal to each other at a ratio of 1:1, but is not limited thereto. By controlling a connecting portion (for example, a gear, a belt, a clutch, etc.) for transmitting the rotational driving force of the motor 120 to the spin-dry tub 130, the motor 120 and the spin-dry tub 130 may be set to be rotated at any other ratio.

The processor 110 may receive feedback of the rotational speed of the motor 120 or that of the spin-dry tub 130 through a hall sensor or the like and thereby control the rotational speed of the motor 120 or that of the spin-dry tub 130, but is not limited thereto.

Meanwhile, the processor 110 may acquire dry clothes weight and wet clothes weight of the laundry put into the spin-dry tub. In detail, in a state where the laundry is put into the spin-dry tub 130, the processor 110 may rotate the spin-dry tub to measure an inertia and thereby calculate the weight of the laundry; or may acquire the weight of the laundry through a separate weight sensor.

Here, the processor 110 may respectively acquire a weight of the laundry when the laundry is in a dry state and that when the laundry is in a wet state, thereby acquiring the dry clothes weight and wet clothes weight of the laundry. For example, in a state where the laundry is put into the spin-dry tub 130 before the washing is started, the processor 110 may acquire the weight of the laundry in the spin-dry tub 130, and thereby acquire the dry clothes weight. In a state where the washing water is drained after the rinsing and before the main spin-drying is started, the processor 110 may acquire the weight of the laundry in the spin-dry tub 130, and thereby acquire the wet clothes weight. However, time when the processor 110 acquires the dry clothes weight and the wet clothes weight of the laundry is not limited thereto.

Here, the wet clothes weight acquired by the processor 110 may optionally include weight of the washing water in addition to the weight of the laundry containing the washing water. For example, when there is laundry of waterproof material among laundries, the washing water remains in the spin-dry tub 130 even after the washing water is drained after the rinsing. The processor 110 acquires the wet clothes weight in that state and thus, the wet clothes weight acquired here further includes the weight of the washing water remaining in the spin-dry tub 130.

Figure 2:
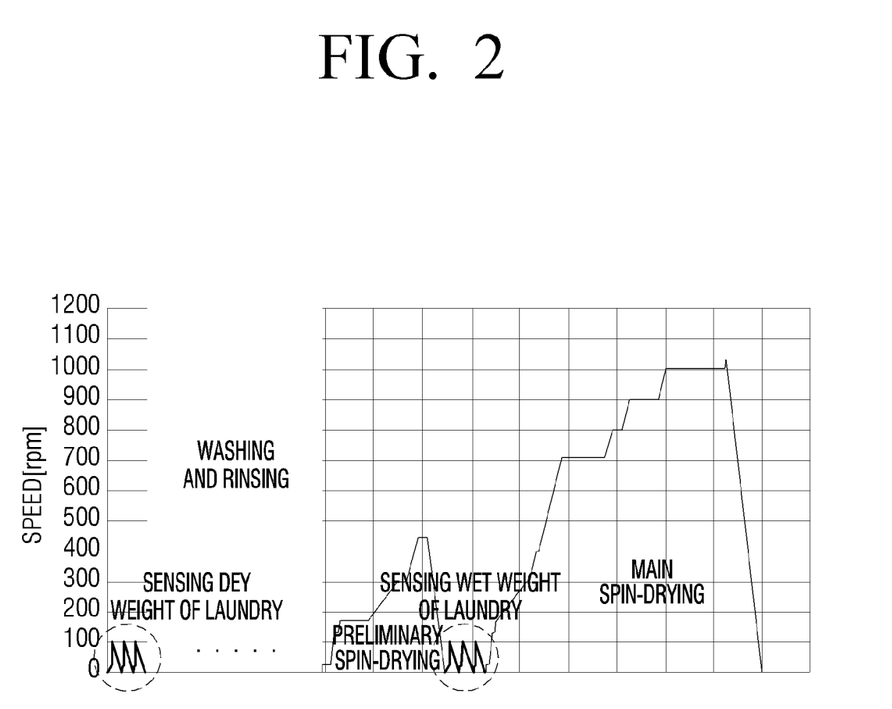
FIG. 2 is an exemplary view for explaining a process of sensing dry clothes weight and wet clothes weight of the laundry according to an embodiment in the disclosure.

FIG. 2 is an exemplary view for explaining a process of acquiring dry clothes weight and wet clothes weight of the laundry according to an embodiment in the disclosure. In FIG. 2, an abscissa represents a time flow of all the washing processes including the washing, rinsing and spin-drying; and an ordinate represents the rotational speed of the motor 120 or that of the spin-dry tub 130.

As illustrated in FIG. 2, in a state where an initial laundry is put into spin-dry tub 130, the processor 110 may drive the motor 120 to rotate the spin-dry tub 130, and thereby calculate a rotational inertia value of the spin-dry tub 130 acquired by rotating the spin-dry tub 130. In this manner, the processor 110 may sense the dry clothes weight of the laundry.

In detail, the heavier the weight of the laundry is, the longer time taken for the spin-dry tub 130 to rotate once; and the spin-dry tub 130 has a reduced rotational angular velocity and thus a greater rotational inertia value of the laundry. Accordingly, the processor 110 uses this relationship to measure the time taken for the spin-dry tub 130 to rotate and the rotational angular velocity of the spin-dry tub 130, and thereby calculate the rotational inertia value of the laundry and acquire the weight of the laundry on the basis of the calculated rotational inertia value.

Here, the processor 110 may measure the rotation time and the speed of the spin-dry tub 130 using, for example, the hall sensor, but is not limited thereto and may use other known means.

Thereafter, when the washing and rinsing is completed, the washing machine 100 drains the washing water from the spin-dry tub 130, and then performs the spin-drying. Here, as shown in FIG. 2, the spin-drying may include a preliminary spin-drying and a main spin-drying. The preliminary spin-drying is performed before the main spin-drying in which the laundry is spin-dried by raising the rotational speed of the spin-dry tub 130 up to a preset maximum rotational speed. In this preliminary spin-drying, the spin-dry tub 130 is rotated at a rotational speed lower than that in the main spin-drying to remove a certain amount of the washing water contained in the wet clothes. According to the embodiment, eccentric amount of the laundry or the like may be measured in the preliminary spin-drying.

According to an embodiment in the disclosure, as illustrated in FIG. 2, the processor 110 may also acquire the wet clothes weight of the laundry by rotating the spin-dry tub 130 after the preliminary spin-drying is completed in the same manner by which the above-described dry clothes weight is acquired. In this case, because the washing water contained in the wet clothes is partially removed in the preliminary spin-drying, the wet clothes weight may be sensed more accurately. However, sensing of the wet clothes weight is not limited hereto, and may also be possible before the preliminary spin-drying.

However, examples in which the processor 110 acquires the weight of the laundry are not limited thereto. The processor 110 may sense the weight of the laundry through a separate weight sensor, or also acquire the dry clothes weight and the wet clothes weight of the laundry using other methods.

Meanwhile, the processor 110 may determine whether the washing machine 100 is overloaded in the spin-drying on the basis of the dry clothes weight and the wet clothes weight of the laundry acquired as described above. Here, the washing machine 100 overloaded in the spin-drying refers to a following case: when an excessive amount of the laundry is put into the spin-dry tub 130, the laundry of the waterproof material is put into the spin-dry tub 130, or the like, the washing water may not be normally drained after the rinsing; in case that the spin-drying is performed in that state, the washing machine 100 has higher failure rate.

In detail, the processor 110 may determine that the washing machine is overloaded when the wet clothes weight of the laundry put into the spin-dry tub 130 has a value more than a preset threshold value. That is, even though the acquired wet clothes weight has a value more than a preset weight, when the spin-drying is performed in that state and thus the rotational speed of the spin-dry tub 130 is raised up to the preset maximum rotational speed, the washing machine 100 has higher failure rate. Accordingly, the processor 110 is required to sense the wet clothes weight of the laundry. According to an embodiment in the disclosure, when the acquired wet clothes weight has a value more than the preset threshold value, the processor 110 may sense and determine that the washing machine 100 is overloaded in the spin-drying. Here, the preset threshold value may be a value acquired from experiments conducted by a manufacturer of the washing machine depending on capacity of the washing machine.

Figure 3:
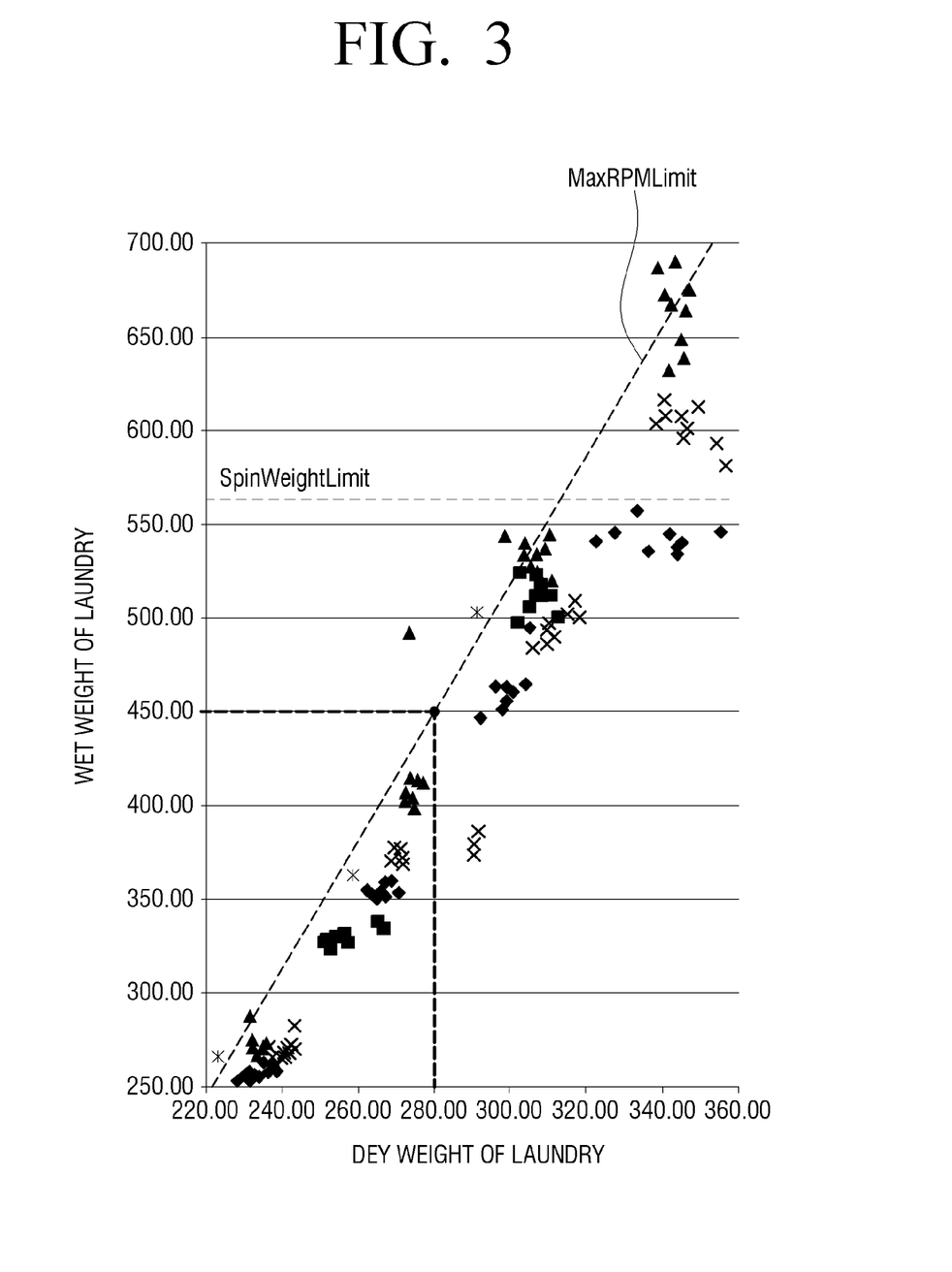
FIG. 3 is an exemplary view illustrating pre-measured data on wet clothes weight compared to dry clothes weight according to an embodiment in the disclosure.

The SpinWeightLimit in FIG. 3 is an example of this preset threshold value. Referring to the example in FIG. 3, when the acquired wet clothes weight is more than 560, the processor 110 may determine that the washing machine is overloaded.

In addition, the processor 110 may determine that the washing machine is overloaded when the wet clothes weight of the laundry put into the spin-dry tub 130 has a value more than a threshold value calculated on the basis of the dry clothes weight of the laundry. That is, as described above, not only when the acquired wet clothes weight has a value more than the preset threshold value, but also when the acquired wet clothes weight has the preset threshold value or less but still is beyond a normal range of the wet clothes weight on the basis of the dry clothes weight, the processor 110 may determine that the washing machine 100 is to be overloaded.

To this end, the processor 110 may calculate the threshold value on the basis of pre-measured data on the wet clothes weight compared to the dry clothes weight of the laundry; therefore, when the acquired wet clothes weight has a value more than the calculated threshold value, the processor 110 may determine that overload of the washing machine 100 occurs in the spin-drying.

FIG. 3 is an exemplary view illustrating pre-measured data on wet clothes weight compared to dry clothes weight according to an embodiment in the disclosure. In detail, FIG. 3 illustrates data showing various types of laundry loads, that is, measured weight of each laundry measured in a dry state and that in a wet state. In FIG. 3, an abscissa represents the dry clothes weight, and an ordinate represents the wet clothes weight. Here, the unit of weight is not limited to a specific unit.

As seen from data illustrated in FIG. 3, there is a tendency in which more laundries contain more washing water and thus the greater the dry clothes weight, the greater the wet clothes weight. When generalizing this tendency, it is possible to derive a linear relation such as MaxRPMLimit in FIG. 3; and the processor 110 may calculate the above-described threshold value using this linear equation.

In detail, the processor 110 may calculate the threshold value using the following equation:

[Equation]

$$\text{MaxRPMLimit} = WCS * \text{WashWeightData} + WCI$$

Here, MaxRPMLimit is the threshold value; WCS is a slope value of the wet clothes weight compared to the dry clothes weight in the pre-measured data; WashWeightData is the dry clothes weight of actual laundry acquired by the processor 110; and WCI is the wet clothes weight compared to a minimum dry clothes weight in the pre-measured data, i.e. y-intercepts in a graph.

For example, when 280 is the dry clothes weight of actual laundry put into the spin-dry tub 130 for the washing and 500 is the wet clothes weight of the actual laundry, the processor 110 may calculate 450 as MaxRPMLimt, i.e. the threshold value, on the basis of the pre-measured data as illustrated in FIG. 3. Here, wet clothes weight of the actual laundry acquires value 550, which is more than the threshold value, the processor 110 may determine that the washing machine is overloaded. When the wet clothes weight of the actual laundry acquires value 450 or less, the processor 110 may determine that the washing machine 100 is not overloaded.

That is, when the acquired wet clothes weight does not have a value more than the preset threshold value (SpinWeightLimit in FIG. 3), but still has a value beyond the threshold value calculated on the basis of the dry clothes weight (MaxRPMLimit in FIG. 3), the processor 110 may determine that the washing machine 100 is to be overloaded in the spin-drying.

As such, the processor 110 may determine that when the wet clothes weight is abnormal compared to the dry clothes weight, the washing machine is overloaded, and thereby sense that the washing machine 100 is overloaded in case where the washing water is not drained after the rinsing because the laundry of waterproof material is in the spin-dry tub 130.

Meanwhile, the pre-measured data, i.e. the linear equation in the example in FIG. 3, may be derived from experiments conducted by the manufacturer of the washing machine 100 and then stored in the washing machine 100. The pre-measured data is the linear equation having a form of a straight line in the example in FIG. 3, but it is not limited thereto. For example, the pre-measured data may be a quadratic equation or higher order equation, and the graph may have one of various shapes such as S shape, J shape, and stepwise shape.

As such, when determining that the washing machine 100 is overloaded as a result of determining whether or not the washing machine 100 is overloaded in the spin-drying, the processor 110 may limit the maximum rotational speed of the spin-dry tub 130 in the spin-drying. As described above, the processor 110 drives the motor 120 so that the maximum rotational speed of the spin-dry tub 130 has a preset value during the spin-drying. However, when determining that the washing machine 100 is overloaded, the processor 110 may control the driving of the motor 120 such that the maximum rotational speed of the spin-dry tub 130 has a value less than the preset value in the spin-drying. For example, the processor 110 may limit the maximum rotational speed of the spin-dry tub 130 from 40% to 70% of the preset value.

However, when it is determined that the washing machine is overloaded, operations of the washing machine 100 are not limited thereto. For example, the spin-drying is stopped first and then a separate warning message or a message asking whether to continue the spin-drying is output to the user.

Figure 4:
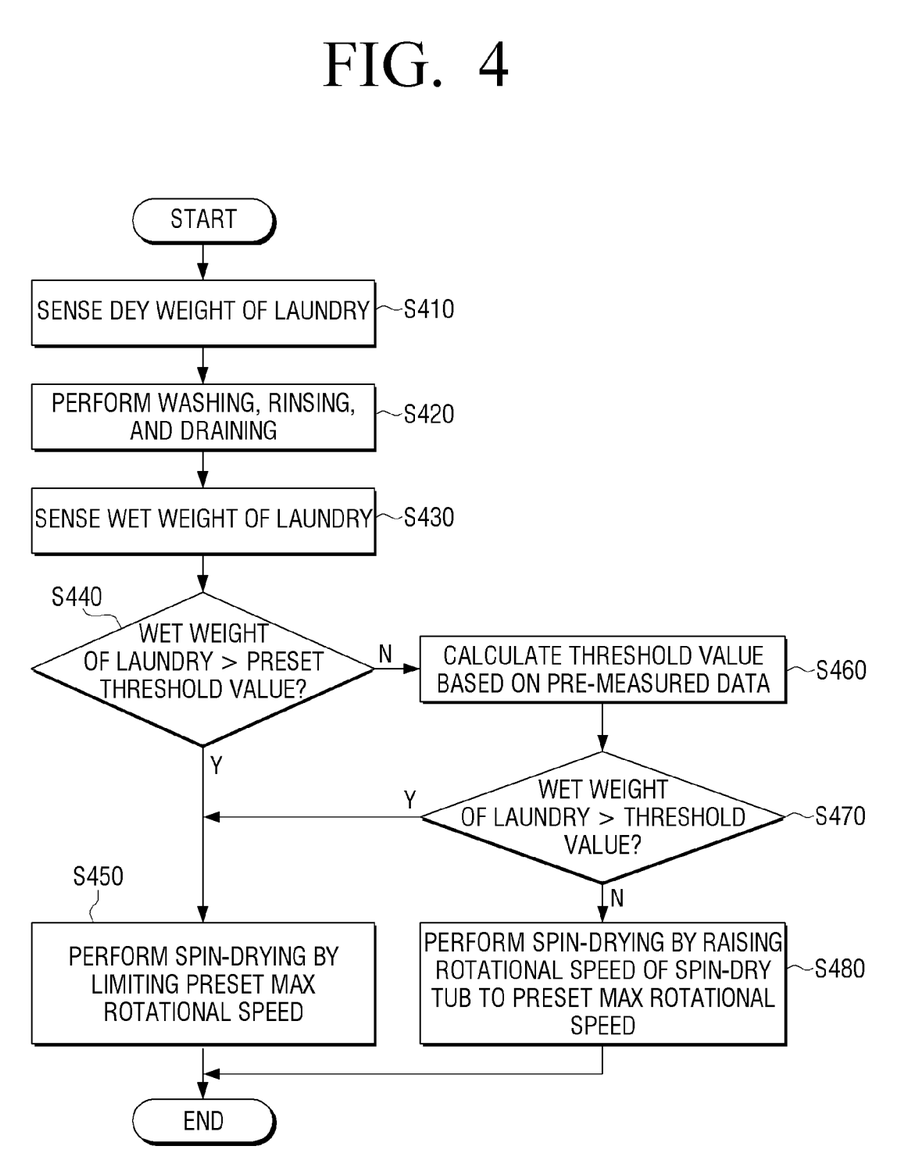
FIG. 4 is a flowchart illustrating operations of a washing machine according to another embodiment in the disclosure.

FIG. 4 is a flowchart illustrating operations of a washing machine according to an embodiment in the disclosure. Referring to FIG. 4, the processor 110 senses the dry clothes weight of the laundry put into the spin-dry tub 130 (S410), and performs washing, rinsing, and draining according to a set algorithm (S420). When the rinsing and draining are completed, the processor 110 senses the wet clothes weight of the laundry (S430).

Here, in a state where the laundry is in the dry state and the wet state, respectively, in all the washing processes, the processor 110 may rotate the spin-dry tub 130 to measure a rotational inertia value of the spin-dry tub 130 and thereby acquire the dry clothes weight and wet clothes weight of the laundry, respectively. In addition, according to an embodiment, the processor 110 may acquire the wet clothes weight of the laundry after the preliminary spin-drying is completed during the spin-drying.

As such, when acquiring the dry clothes weight and wet clothes weight of the laundry, the processor 110 determines whether the acquired wet clothes weight of the laundry has a value more than the preset threshold value (S440). As a result of the determining, when the wet clothes weight of laundry has a value more than the preset threshold value (S440, Y), the processor 110 performs the spin-drying by limiting the preset maximum rotational speed of the spin-dry tub 130 in the spin-drying (S450). For example, the processor 110 performs the spin-drying by limiting the maximum rotational speed of the spin-dry tub 130 from 40% to 70% of the preset maximum rotational speed.

When the acquired wet clothes weight of the laundry has the preset threshold value or less (S440, N), the processor 110 calculates a threshold value on the basis of the pre-measured data on the wet clothes weight of the laundry compared to the dry clothes weight of the laundry (S460) and determines whether the acquired wet clothes weight of the laundry has a value more than the calculated threshold value (S470).

Accordingly, the acquired wet clothes weight of the laundry has a value more than the calculated threshold value (S470, Y), the processor 110 performs the spin-drying by limiting the preset maximum rotational speed of the spin-dry tub 130 in the spin-drying (S450). When determining that the acquired wet clothes weight of the laundry has the calculated threshold value or less (S470, N), the processor 110 may perform the spin-drying by raising the rotational speed of the spin-dry tub 130 up to the preset maximum rotational speed in spin-drying (S480).

As such, before actually starting the spin-drying, the processor 110 determines whether the washing machine 100 is overloaded. When determining that the washing machine 100 is overloaded, the processor 110 limits the maximum rotational speed of the spin-dry tub 130. In this manner, the washing machine 100 may have improved stability and lower failure rate.

Figure 5:
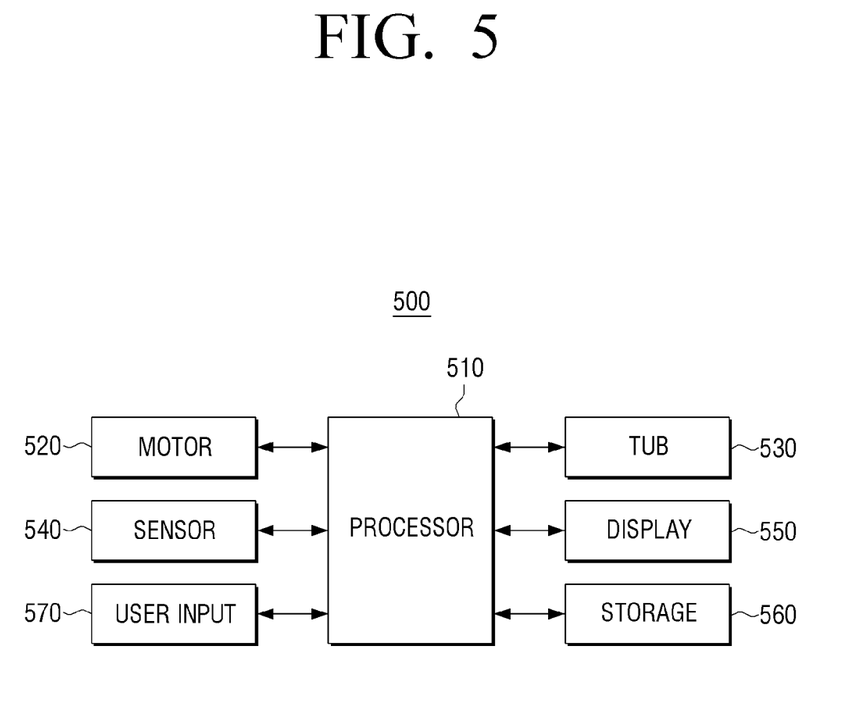
FIG. 5 is a detailed block diagram illustrating a washing machine according to an embodiment in the disclosure.

FIG. 5 is a detailed block diagram illustrating a washing machine according to an embodiment in the disclosure. Referring to FIG. 5, the washing machine 500 includes a processor 510, a motor 520, a tub 530, a sensor 540, a display 550, a storage 560, and a user input 570.

The tub 530 includes an inner tub (not illustrated) and an outer tub (not illustrated). The outer tub is connected to an outer case (not illustrated) of the washing machine 500 through a damper (not illustrated) for reducing vibration of the washing machine 500, and includes an inner tub for performing washing. Here, the inner tub has the same configuration as that of the spin-dry tub 130 described above, and the motor 520 has the same configuration as that of the motor 120, a repetitive description is omitted.

The sensor 540 senses various physical quantities depending on operations of the washing machine 500. To this end, the sensor 540 may include various types of sensors. For example, the sensor 540 may include a weight sensor (not illustrated), an acceleration sensor (not illustrated), a current sensor (not illustrated), and the like.

The current sensor may sense a control current driving the motor 520 and provide a sense signal to the processor 510. Accordingly, the processor 510 may convert the sense signal provided from the current sensor into a torque value of the motor 520. Here, the current sensor may be called a torque sensor.

The acceleration sensor may sense a rotational speed of the motor 520. In detail, the acceleration sensor may sense rotation of the motor 520 and provide a sense signal to the processor 510. The processor 510 converts the sense signal provided from the acceleration sensor into acceleration of the motor 520. Here, the acceleration sensor may be a hall sensor that generates a pulse signal depending on the rotation of the motor 520, but is not limited thereto.

The weight sensor senses weight of laundry put into the inner tub, i.e. spin-dry tub 130. In detail, the weight sensor senses weight of the inner tub and the weights of laundries put into the inner tub when the laundry is in dry state and when the laundry in wet state, under control of the processor 510, and then provides each sensed weight to the processor 510.

The user input 570 is a component that receives an operation command for the washing machine 500 from a user. The user may input various user commands for the operations of the washing machine 500 through the user input 570. For example, the user may set the washing course or turn on/off the power of the washing machine 500 through the user input unit 570. To this end, the user input 570 may be implemented by various buttons, touch panels, and the like.

The display 550 may display various user interfaces (UIs) for setting the operations of the washing machine 500 including a washing course setting. In addition, the display 550 may display various user interfaces (UIs) indicating a washing process or the like and various error messages due to a malfunction of the washing machine 500. To this end, the display 550 may be implemented in various forms such as at least one light emitting diode (LED) lamp, a liquid crystal display (LCD), an organic light emitting diodes (OLDE), or the like. In addition, the display 550 may form a touch screen together with a touch panel, which is an example of the user input 570.

The storage 560 stores various programs and data for the operations of the washing machine 500. In particular, the storage 560 may store pre-measured data for the wet clothes weight compared to the dry clothes weight. To this end, the storage 560 may include a read only memory (ROM), a random access memory (RAM), a flash memory, and the like.

The processor 510 controls all the operations of the washing machine 500. The processor 510 may perform the same operation as the processor 110 in FIG. 1. Here, the processor 510 may include one or more of a central processing unit (CPU), a controller, an application processor (AP), a communication processor (CP), an ARM processor, and the like. The processor 510 may, for example, control at least one other component of washing machine 500 and/or execute computations and data processing related to communications.

In particular, the processor 510 may calculate torque variation amount or acceleration variation amount of the motor on the basis of a torque or an acceleration of the motor 520 sensed through the sensor 540 during the spin-drying.

In detail, when sensing the control current signal for controlling the driving of the motor 520 through the sensor 540 during the spin-drying, the processor 510 may convert the sensed control current signal into the torque of the motor 520, and calculate the torque variation amount of the motor 520 by filtering (in particular, high pass filtering) a value of the converted torque.

In addition, when sensing the rotational speed of the motor 520 through the sensor 540 during the spin-drying, the processor 510 may convert the sensed rotational speed signal of the motor 520 into rotational acceleration of the motor 520, and calculate the acceleration variation amount of the motor 520 by filtering (in particular, high pass filtering) a value of the converted rotational acceleration.

Accordingly, when the calculated torque variation amount has a value more than a preset threshold value or the acceleration variation amount has a value more than a preset threshold value, the processor 510 may stop the spin-drying in progress. Here, the preset threshold value compared with the torque variation amount and the preset threshold value compared with the acceleration variation amount are values different from each other.

In detail, when the spin-drying is performed and eccentricity of the laundry occurs during the motor 520 is rotated, the motor 520 has torque variation and acceleration variation. Accordingly, the processor 510 may use the torque variation amount or the acceleration variation amount of the motor 520 to sense the vibration of the washing machine 500. In particular, the greater the torque variation amount or the acceleration variation amount is, the greater the vibration of the washing machine 500 is. Therefore, when the torque variation amount of the motor 520 has a value greater than the preset threshold value or the acceleration variation amount of the motor 520 has a value greater than the preset threshold value, the processor 510 may determine that great vibration occurs in the washing machine 500, and stop the spin-drying in progress. For example, the processor 510 may stop the rotation of the motor 520 to stop the rotation of the inner tub (not illustrated), thereby stopping the spin-drying and control the display 550 to display an error message indicating that the vibration occurs in the washing machine 500. According to the embodiment, the washing machine 500 may further include an audio output (not illustrated) such as a speaker, and may output a warning alarm together with the error message.

Meanwhile, according to an embodiment in the disclosure, in a low-speed rotation section in which the motor 520 has a rotational speed having a value less than the preset value, the processor 510 may determine whether the torque variation amount has a value more than the preset threshold value to determine whether the spin-drying is to be stopped. In a high-speed rotation section in which the motor 520 has a rotational speed having a value more than the preset value, the processor may determine whether the acceleration variation amount has a value more than the preset threshold value to determine whether the spin-drying is to be stopped. On the basis of the experiment, the torque variation amount in the low-speed rotation section and the acceleration variation amount in the high-speed rotation section are advantageous in sensing the vibration of the washing machine 500. The reason is that according to the experiments, the torque variation amount in the low-speed rotation section and the acceleration variation amount in the high-speed rotation section are respectively advantageous for sensing the vibration of the washing machine 500.

Meanwhile, as seen above, as an example, the torque variation amount or the acceleration variation amount of the motor 510 is used to sense the vibration of the washing machine 500 in the spin-drying; however, is not limited thereto. In other washing process, the torque variation amount or the acceleration variation amount of the motor 510 may be used to sense the vibration of the washing machine 500.

Accordingly, even when the washing machine 500 does not include an acceleration sensor such as a micro electronic mechanical system (MEMS) sensor or the washing machine 500 includes the MEMS sensor, which is damaged or malfunctions, the processor may use the torque variation amount or the acceleration variation amount of the motor 520 to sense the vibration of the washing machine 500. The processor may control the operations of the washing machine 500 depending on a sensed vibration of the washing machine, thereby lowering damage and failure rates of the washing machine.

Figure 6:
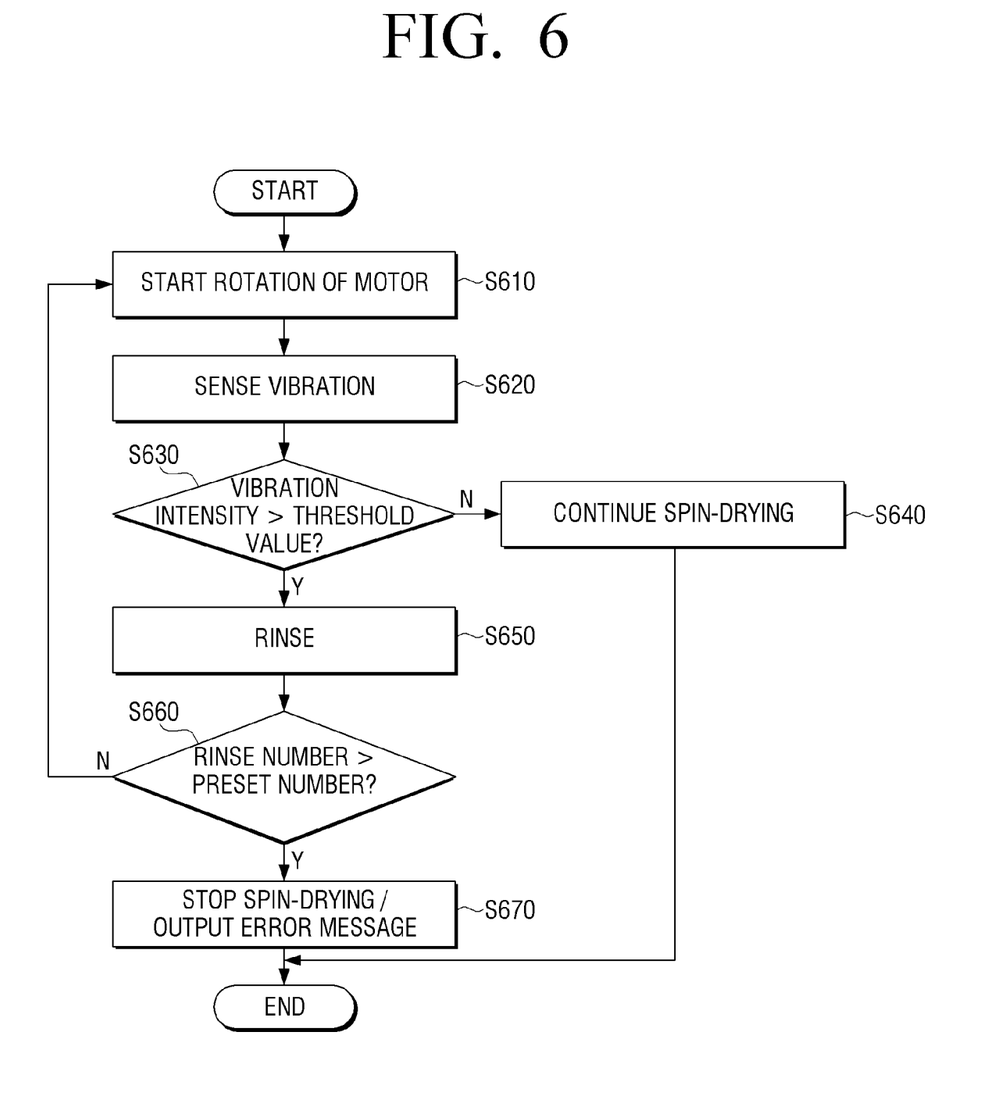
FIG. 6 is a flowchart illustrating operations of a washing machine according to another embodiment in the disclosure.

FIG. 6 is a flowchart illustrating operations of a washing machine according to another embodiment in the disclosure. Processes in FIG. 6 may be performed during the spin-drying such as S450 or S480 in FIG. 4, but are not limited thereto.

Referring to FIG. 6, the processor 510 starts the rotation of the motor 520 in a process requiring the rotation of the motor 520, particularly in the spin-drying (S610). Thereafter, the processor 510 may calculate the torque variation amount or the acceleration variation amount on the basis of the torque signal or the acceleration signal sensed through the sensor 540 to sense the vibration of the washing machine 500 (S620). Accordingly, the processor 510 may determine whether vibration intensity of the washing machine 500 has a value more than a preset threshold value (S630). In detail, the torque variation amount and the acceleration variation amount are proportional to the vibration intensity; therefore, the processor 510 may calculate the torque variation amount and the acceleration variation amount to sense the vibration of the washing machine 500, and determine whether the torque variation amount or the acceleration variation amount has a value more than each preset threshold value to determine whether the vibration intensity of the washing machine 500 has a value more than the preset threshold value.

When determining that the vibration intensity of the washing machine 500 has the preset threshold value or less (S630, N), the processor 510 continues the spin-drying in progress (S640).

However, when the processor determines that the vibration intensity of the washing machine 500 has a value more than the preset threshold value (S630, Y), eccentricity of the laundry occurs. Therefore, in order to solve this problem, the processor 510 puts washing water into the inner tub (not illustrated) again to perform rinsing (S650).

When the rinsing is completed, the processor 510 determines whether the rinse number is more than a preset number (S660). When the rinse number is more than the preset number (S660, Y), the processor 510 stops the spin-drying and outputs an error message (S670). When the number of the rinsing is the preset number or less (S660, N), the processor 510 restarts the spin-drying to start the rotation of the motor 520 (S610).

Meanwhile, start of the rotation of the motor in S610 refers to the start of the rotation of the motor when the preliminary spin-drying is completed in the spin-drying and then the main spin-drying is started according to the embodiment. In addition, according to the embodiment in the disclosure, when the torque variation amount or the acceleration variation amount has a value more than each preset threshold value, the processor determines that excessive vibration occurs in the washing machine. Therefore, unlike the embodiment illustrated in FIG. 6, the processor does not perform the rinsing S650 but immediately stops the spin-drying to stop the rotation of the motor 520, and then outputs an error message.

Figure 7:
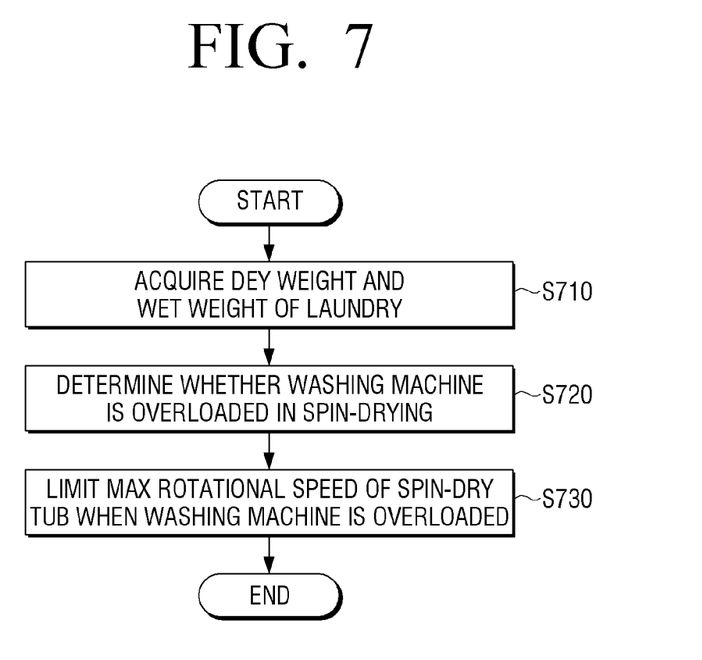
FIG. 7 is a flow chart illustrating a method for controlling a washing machine according to an embodiment in the disclosure.

FIG. 7 is a flow chart illustrating a method for controlling a washing machine according to an embodiment in the disclosure. Referring to FIG. 7, the washing machines 100 and 500 each acquires the dry clothes weight and the wet clothes weight of the laundry put into the spin-dry tub (S710). Here, the washing machines 100 and 500 each includes a motor for driving a spin-dry tub so that the maximum rotational speed of the spin-dry tub has the preset value in spin-drying.

For example, the washing machines 100 and 500 may each calculate the inertia value by rotating the spin-dry tub in a state in which the laundry is put into the spin-dry tub and acquire the dry clothes weight and the wet clothes weight of the laundry on the basis of the calculated inertia value of the laundry. In addition, the washing machines 100 and 500 may each acquire the dry clothes weight and the wet clothes weight of the laundry through a separate weight sensor.

Meanwhile, the spin-drying includes preliminary spin-drying and main spin-drying, and the washing machines 100 and 500 may each acquire the wet clothes weight of the laundry after the preliminary spin-drying is completed.

Accordingly, it is determined whether each of the washing machines 100 and 500 is overloaded in the spin-drying on the basis of the acquired dry clothes weight and the wet clothes weight.

For example, when the wet clothes weight of the laundry has a value more than the preset threshold value, each of the washing machines 100 and 500 may be determined to be overloaded.

In addition, when the wet clothes weight of the laundry has a value more than a threshold value calculated on the basis of the dry clothes weight of the laundry, each of the washing machines 100 and 500 may be determined to be overloaded. Here, the washing machines 100 and 500 may each calculate the threshold value on the basis of pre-measured data on the wet clothes weight compared to the dry clothes weight of the laundry. In detail, the washing machines 100 and 500 may each calculate the threshold value using the following equation:

$$MaxRPMLimit = WCS * WashWeightData + WCI$$

Here, MaxRPMLimit is the threshold value; WCS is a slope value of the wet clothes weight compared to the dry clothes weight in the pre-measured data; WashWeightData is the acquired dry clothes weight; and WCI is the wet clothes weight compared to a minimum dry clothes weight in the pre-measured data.

Accordingly, when determined to be overloaded, the washing machines 100 and 500 each limits the maximum rotational speed of the spin-dry tub in the spin-drying (S730). In detail, the washing machines 100 and 500 may each control the driving of the motor such that the maximum rotational speed of the spin-dry tub has a value less than the preset value.

For example, when determined to be overloaded, the washing machines 100 and 500 may each limit the maximum rotational speed of the spin-dry tub from 40% to 70% of the preset value.

Meanwhile, according to an embodiment in the disclosure, the washing machines 100 and 500 may each further include a sensor for sensing at least one of a torque and an acceleration of the motor. Accordingly, the washing machines 100 and 500 may each calculate at least one of a torque variation amount and an acceleration variation amount of the motor on the basis of at least one of the torque and the acceleration of the motor sensed through the sensor during performing the spin-drying, and then stop the spin-drying when the calculated torque variation amount has a value more than a preset threshold value or the calculated acceleration variation amount has a value more than a preset threshold value.

Here, according to an embodiment in the disclosure, in a low-speed rotation section in which the motor has a rotational speed having a value less than the preset value, the washing machines 100 and 500 each determines whether the torque variation amount has a value more than the preset threshold value; and in a high-speed rotation section in which the motor has a rotational speed having a value more than the preset value, the washing machines 100 and 500 each determines whether the acceleration variation amount has a value more than the preset threshold value. When the torque variation amount or the acceleration variation amount has a value more than each preset threshold value, the washing machines 100 and 500 may each stop the spin-drying. For example, the washing machines 100 and 500 may each stop the rotation of the motor and output an error message or a warning alarm.

As seen above, according to various embodiments in the disclosure, each of the washing machines 100 and 500 may sense overload thereof before starting spin-drying and vibration thereof without the micro electronic mechanical system (MEMS) sensor. Operations of each of the washing machines 100 and 500 are controlled depending on the overload or vibration thereof sensed as described above; and thus, the washing machines 100 and 500 may each have improved stability and lower failure rate.

Meanwhile, each operation of the processors 110 and 510 of the washing machines 100 and 500 and a method for controlling the washing machine according to various embodiments described above may be generated by software and loaded in each of the washing machines 100 and 500.

For example, each of the washing machines 100 and 500 may be loaded with a non-transitory computer readable medium having a program for performing a method for controlling a washing machine with a motor for driving a spin-dry tub such that a maximum rotational speed of a spin-dry tub has a preset value during spin-drying, the method may include: acquiring dry clothes weight and wet clothes weight of laundry put into the spin-dry tub; determining whether the washing machine is overloaded in the spin-drying on the basis of the acquired dry clothes weight and wet clothes weight; and controlling driving of the motor such that the maximum rotational speed of the motor has a value less than the preset value during the spin-drying, when the washing machine is determined to be overloaded.

Here, the non-transitory computer readable medium is not a medium that stores data for a short period of time, such as a register, cache, memory, or the like, but a medium that semi-permanently stores data and is readable by the device. In particular, the various middleware or programs described above may be stored and provided in the non-transitory computer readable medium such as a compact disc (CD), a digital video disc (DVD), a hard disk, a blu-ray disk, a universal serial bus (USB), a memory card, a read-only memory (ROM), or the like.

The spirit of the disclosure is illustratively described hereinabove. It is to be appreciated by those skilled in the art that various modifications and alterations may be made without departing from the essential characteristics of the disclosure. In addition, the embodiments disclosed herein are not to limit but to describe the spirit in the disclosure. The scope in the disclosure is not limited only to the embodiments. The scope in the disclosure is to be interpreted by the following claims, and it is to be interpreted that all the spirits equivalent to the following claims fall within the scope in the disclosure.

The invention claimed is:

1. A washing machine comprising:
a motor configured to drive a spin-dry tub such that a maximum rotational speed of the spin-dry tub has a preset value during spin-drying; and
a processor configured to:
acquire a dry clothes weight and a wet clothes weight of laundry put into the spin-dry tub,
determine whether the washing machine is overloaded in the spin-drying based on the acquired dry clothes weight and wet clothes weight, and
control driving of the motor such that the maximum rotational speed of the motor has a value less than the preset value during the spin-drying, if the washing machine is determined to be overloaded,
wherein the processor is configured to determine that the washing machine is overloaded when the wet clothes weight of the laundry has a value more than a threshold value calculated based on the dry clothes weight of the laundry.

2. The washing machine as claimed in claim 1, wherein the processor is configured to determine that the washing machine is overloaded when the wet clothes weight of the laundry has a value more than a preset threshold value.

3. The washing machine as claimed in claim 1, wherein the processor is configured to calculate the threshold value based on a pre-measured data on the wet clothes weight compared to the dry clothes weight of the laundry.

4. The washing machine as claimed in claim 3, wherein the processor is configured to calculate the threshold value according to an equation as follows:

$$MaxRPMLimit = WCS * WashWeightData + WCI,$$

in which MaxRPMLimit is the threshold value, WCS is a slope value of the wet clothes weight compared to the dry clothes weight in the pre-measured data, WashWeightData is the acquired dry clothes weight, and WCI is the wet clothes weight compared to a minimum dry clothes weight in the pre-measured data.

5. The washing machine as claimed in claim 1, wherein the spin-drying includes a preliminary spin-drying and a main spin-drying; and
the processor is configured to acquire the wet clothes weight of the laundry after the preliminary spin-drying.

6. The washing machine as claimed in claim 1, wherein the processor is configured to:
calculate a rotational inertia value by rotating the spin-dry tub in a state where the laundry is put into the spin-dry tub, and
acquire the dry clothes weight and the wet clothes weight based on the calculated rotational inertia value of the laundry.

7. The washing machine as claimed in claim 1, wherein when it is determined that the washing machine is overloaded, the processor is configured to limit the maximum rotational speed of the spin-dry tub from 40% to 70% of the preset value.

8. The washing machine as claimed in claim 1, further comprising a sensor configured to sense at least one of a torque and an acceleration of the motor,
wherein the processor is configured to:
calculate at least one of a torque variation amount or an acceleration variation amount of the motor based on at least one of the torque or the acceleration of the motor sensed through the sensor during performing the spin-drying, and
stop the spin-drying when the calculated torque variation amount has a value more than a preset threshold value or the calculated acceleration variation amount has a value more than a preset threshold value.

9. The washing machine as claimed in claim 8, wherein:
in a low-speed rotation section in which the motor has a rotational speed having a value less than the preset value, the processor is configured to determine whether the torque variation amount has a value more than the preset threshold value; and
in a high-speed rotation section in which the motor has a rotational speed having a value more than the preset value, the processor is configured to determine whether the acceleration variation amount has a value more than the preset threshold value.

10. A method for controlling a washing machine including a motor for driving a spin-dry tub such that a maximum rotational speed of the spin-dry tub has a preset value during spin-drying, the method comprising:
acquiring a dry clothes weight and a wet clothes weight of laundry put into the spin-dry tub;
determining whether the washing machine is overloaded in the spin-drying based on the acquired dry clothes weight and wet clothes weight; and
controlling driving of the motor such that the maximum rotational speed of the motor has a value less than the preset value during the spin-drying, if the washing machine is determined to be overloaded, wherein determining whether the washing machine is overloaded further comprises determining that the washing machine is overloaded when the wet clothes weight of the laundry has a value more than a threshold value calculated based on the dry clothes weight of the laundry.

11. The method as claimed in claim 10, wherein in the determining, the washing machine is determined to be overloaded when the wet clothes weight of the laundry has a value more than a preset threshold value.

12. The method as claimed in claim 10, wherein in the determining, the threshold value is calculated based on a pre-measured data on the wet clothes weight compared to the dry clothes weight of the laundry.

13. The method as claimed in claim 12, wherein in the determining, the threshold value is calculated according to an equation as follows:

$$MaxRPMLimit = WCS * WashWeightData + WCI,$$

in which MaxRPMLimit is the threshold value; WCS is a slope value of the wet clothes weight compared to the dry clothes weight in the pre-measured data; WashWeightData is the acquired dry clothes weight; and WCI is the wet clothes weight compared to a minimum dry clothes weight in the pre-measured data.

* * * * *